Apr. 17, 1923.
C. E. PARKHURST
1,452,311
HEATING DEVICE FOR LIQUIDS
Filed March 11, 1922
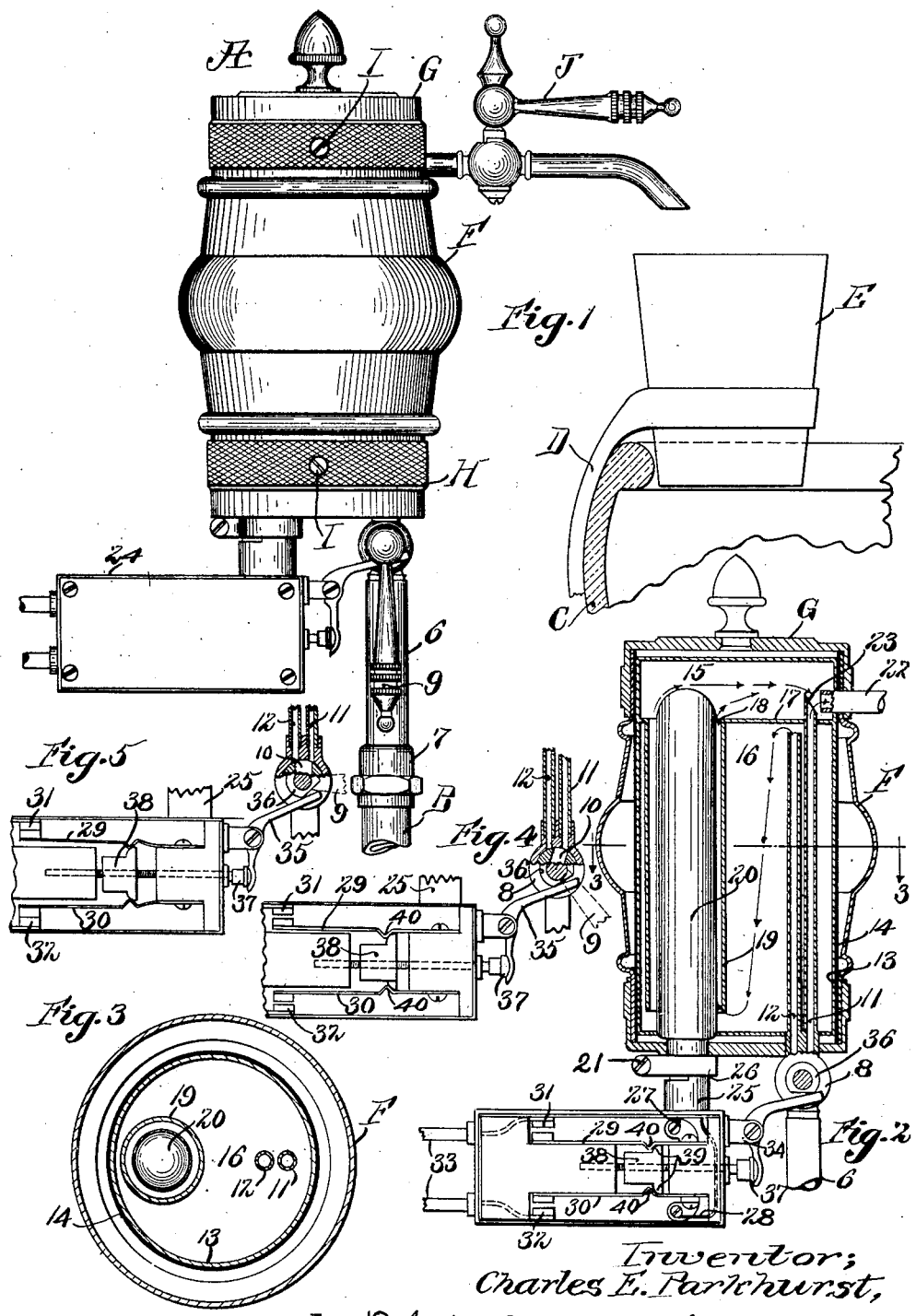
Inventor;
Charles E. Parkhurst,
by Roberts, Roberts & Cushman
his attys Patented Apr. 17, 1923.

1,452,311

UNITED STATES PATENT OFFICE.

CHARLES E. PARKHURST, OF SOMERVILLE, MASSACHUSETTS.

HEATING DEVICE FOR LIQUIDS.

Application filed March 11, 1922. Serial No. 542,989.

*To all whom it may concern:*

Be it known that I, CHARLES E. PARKHURST, citizen of the United States of America, and resident of Somerville, in the county of Middlesex and State of Massachusetts, have invented new and useful Improvements in Heating Devices for Liquids, of which the following is a specification.

This invention relates to heating devices for liquids and particularly to devices in which electricity serves as the heating medium.

Objects of the invention are to provide liquid unheated or heated to any desired temperature at will, to maintain the heating means inoperative except when heated liquid is being drawn, and in general to provide a simple, efficient, economical and easily operated device of the character referred to.

The invention comprises a heating device having liquid control means including a valve, the valve having a plurality of positions in which liquid flows and means operative in a part only of the positions of the valve for heating the flowing liquid. The heating device has a single inlet, a single outlet, and at least two passages therethrough. A single valve controls the flow of liquid through the passages, and heating means are associated with one of the passages and adapted for control by the valve. The valve which is of the dividing type is preferably positioned in the inlet to the device and is interconnected in any suitable manner with the switch to the heating unit. The connection between the valve and the switch is so adjusted that the heating unit is in operation only when the valve is positioned to divert liquid through the passage to the heater.

Provision is made to maintain the heating unit always immersed and to so direct and restrict the volume of liquid adjacent the heating unit that the liquid may be quickly raised to the desired temperature. In its preferred form the device has two chambers vertically disposed. The cold liquid passage leads directly to the upper chamber and terminates adjacent the outlet therefrom and the second passage leads into the lower chamber, then along the entire length of the heating unit and issues into the upper chamber, whence the heated liquid passes the end of the cold liquid passage and discharges through the single outlet.

For the purpose of illustrating the invention one concrete embodiment thereof is shown in the accompanying drawing in which:

Fig. 1 is a side elevation;

Fig. 2 is a vertical section of the heater showing the interior of the electric switch in elevation;

Fig. 3 is a horizontal section on the line 3—3 of Fig. 2;

Fig. 4 is a partly sectional and partly elevational view showing the control valve and the interconnected switch in one position; and Fig. 5 is a view similar to Fig. 4 showing the parts in another position.

The embodiment of the invention shown for the purpose of illustration comprises an electric water heater A, small and compact in form, adapted for the use of dentists. As shown in Fig. 1 the heater is attached to the water supply pipe B adjacent the dentist's cuspidor C which has the usual bracket arm D supporting glass E into which water from the extension on pipe B normally flows. The heater has a short inlet pipe 6 attached to supply pipe B by means of union nut 7. For controlling the flow of liquid into the heater a dividing valve 8 having a handle 9 is provided between pipe 6 and heater A. As shown in Figs. 4 and 5 valve 8 has a single passage 10 therethrough adapted to divert the fluid into either of two pipes 11 and 12 or to divide the flow between them. These pipes extend into the interior of the heater A which consists of an inner casing 13 surrounded by a sleeve 14 of insulating material such as fibre. The interior casing is divided into two chambers 15 and 16 by a substantially horizontally disposed partition 17 near the top of the heater. Partition 17 has an opening 18 from which a tubular member 19 extends downwardly into the lower chamber 16 and terminates adjacent the bottom thereof. Extending upwardly within the tubular member 19 is an electric heating unit 20 of the immersion type, the portion 21 to which the electrical connection is made extending outwardly through the casing at the bottom. Pipe 11 extends upwardly through the lower chamber 16 through an opening in partition 17 and terminates adjacent the outlet pipe 22 which leads from upper chamber 15. In order to direct the fluid from pipe 11 more directly into the outlet pipe 22 the end of pipe 11 is beveled as indicated at 23. Pipe 12 opens into lower chamber 16 at a point adjacent the lower face of partition 17.

Pipe 11 serves as the passage for the cold or unheated water from supply pipe B. The water which is intended to be heated passes upwardly through pipe 12 into chamber 16 from the lower portion of which it finds its way up through tubular member 19 where it is brought into intimate contact with the heating element 20 and finally reaches chamber 15 from which it passes into outlet pipe 22 either mixed or unmixed with the cold water from pipe 11 depending upon the position of the dividing valve 8.

For the convenient and economical operation of the heater means are provided for controlling the operation of the heating unit 20 directly from and automatically with the operation of dividing valve 8. This means includes an electrical switch fast upon the projecting end 21 of the heating unit and interconnected with control handle 9. While any suitable form of switch may be used the preferred form is shown in Figs. 2, 4 and 5. This switch as shown in Fig. 1, is enclosed in a rectangular case 24 attached to portion 21 of the heater by means of the sleeve 25 adapted to telescope thereover. The upper portion of the sleeve is partly cut away and provided with a clamping collar 26. Leads 27 and 28 from the heating unit are connected to spring contact members 29 and 30 respectively which have points on their free ends adapted for electrical connection with contacts 31 and 32 to which leads 33 from some convenient source of electrical supply, such as a lamp socket or a wall socket, are connected. Pivoted upon the bracket 34 upon the exterior of case 24 is a lever 35 one arm of which contacts a cam disc 36 upon valve 8 and the other has a portion received in the slot of a screw head 37 fast on a rod which operates a plunger block 38 which has lateral projections 39 adapted to cooperate with indentations 40 in spring contacts 29 and 30 whereby the latter may be pressed apart to make the electrical connection in an obvious manner.

The heater may be provided with any desired form of ornamental casing F preferably in spaced relation to the inner casing 13 to form additional insulation. The heater may also be provided with top and bottom caps G and H respectively which may be made fast to casing F in any desired manner as by a tight pressed fit or by clamping screws I. Outlet pipe 22 is provided with a faucet J preferably of the kind having two outlets, one leading directly into glass E, the other (not shown) being adapted for the connection of a syringe tube.

The operation of the device will now be described: By manipulating dividing valve 8 by means of handle 9 fluid is caused to issue through faucet J at any desired temperature. In Figs. 1 and 2 the valve is in closed position and the electrical switch is open. In Fig. 4 the valve has been turned to admit water into the cold water passage through pipe 11. In this figure cam surface 36 is shown as about to operate the electric switch, the contact springs 29 and 30 being shown as beginning to separate to make the electrical connection. In Fig. 5 the valve is shown in the position in which fluid is being admitted from pipe 6 into both the cold water passage through pipe 11 and the heated water passage through pipe 12. Plunger block 38 is here shown as forced back sufficiently to make the electrical connection so that the heating unit 20 is in operation. By further moving the handle of the control valve 9 upwardly the supply of fluid is shut off from pipe 11 and directed entirely through pipe 12 so that the water issuing through outlet pipe 22 has all passed through the passage for heated water. In this position of the valve the circuit to the heating unit remains closed. The adjustment of the interconnection between the electric switch and the control valve 8 is such that the circuit to the heating unit is not closed until the valve is in a position to admit water into pipe 12.

Lower chamber 16 is made of such height as to insure that there will always be a body of water around the heating unit to prevent it from being burned out. By having pipe 12 terminate near the top of this chamber air which might otherwise remain trapped in the upper portion of the chamber tends to be forced out. By causing cylindrical member 19 which surrounds the heating unit 20 to terminate adjacent the bottom of the inner casing, the water which is to be heated is caused to travel the entire length of the heating unit in making its way from pipe 12 to upper chamber 15, the restricted space between heating unit 20 and casing 19 reducing the volume of fluid acted upon by the heating unit to such an extent as to insure raising the water to a high temperature before it issues into chamber 15. Hence by properly positioning valve 8 the temperature of the water issuing from the outlet 22 may be at the temperature of supply pipe B or at any intermediate temperature up to that closely approaching the boiling point, which temperature is secured when valve handle 9 is at the upper limit of its throw. The provision of the insulating sleeve 14 together with the air space between it and the outer ornamental casing F prevents the exterior of the heater from becoming so hot that accidental contact therewith would cause a burn.

From the above it will be apparent that valve 8 has a plurality of operative positions in which liquid flows through either or both of pipes 11 and 12 and that the heating unit 20 is operative for heating the flowing liquid only in a part of the positions of the valve. It will be further apparent that when heating unit 20 is in operation the liquid in lower chamber 16 is somewhat raised in temperature by the heat which radiates from tubular member 19 before it passes into the constricted passage within said member where it is acted upon directly by heating unit 20.

While other types of heating units may be used I prefer the immersion type since the heating coils therein are protected against water of condensation which tends to short circuit and burn out the coils in other types.

I claim:

1. A heating device comprising liquid control means including a valve having a plurality of operative positions in which liquid flows, and means operative in a part only of said positions for heating the flowing liquid.

2. A heating device comprising liquid control means including a valve having two positions in which liquid flows in approximately equal volume, and means operative in one only of said positions for heating the flowing liquid.

3. A heating device having a plurality of fluid passages, a heating unit associated with one of said passages, and means for selectively controlling the flow of fluid through said passages, said means being constructed and arranged automatically to control the operation of said heating unit.

4. A heating device having a plurality of fluid passages, an electric heating unit of the immersion type in one of said passages, means maintaining said unit immersed at all times, and means for selectively controlling the flow of fluid through said passages, said means being constructed and arranged automatically to control the operation of said heating unit.

5. A heating device having two fluid chambers, two fluid passages through one of said chambers to the other from a single source of fluid supply, heating means in said first chamber and means including a single control member for regulating the temperature of the fluid issuing from said second chamber.

6. A heating device having an inlet and an outlet, a passage leading from said inlet directly to said outlet, a second passage leading from said inlet to said outlet in a tortuous path, a heating unit associated with said second passage, and means selectively controlling the flow of fluid by either or both of said passages from the inlet to the outlet, said means also controlling said heating unit.

7. A heating device comprising a casing, a horizontal partition dividing said casing into two chambers, pipes conducting fluid into both chambers, an elongate heating unit in the lower chamber, means conducting the fluid in the chamber along said heating unit and into the upper chamber and means for rendering said heating unit operative when fluid is admitted to said lower chamber.

8. A heating device having a single inlet, a single outlet, and two fluid passages therethrough, a heating unit associated with one of said passages, and means for automatically rendering said unit operative when fluid is admitted to its passage.

9. A heating device having a single inlet, a single outlet and two fluid passages therethrough, an electric heating unit in one of said passages, a single valve in said inlet for controlling the flow of fluid through both said passages, and means interconnected with said valve for rendering said unit operative, when fluid is admitted to the heating passage.

10. A heating device comprising a casing having an inlet and an outlet, an electric heating unit in said casing, a switch for controlling said unit, and means for conducting fluid from said inlet directly to said outlet and for diverting it past said heating unit, a single valve for controlling said means, said valve being interconnected with said switch.

11. A heating device having connections to a source of fluid supply and to a source of electricity, a plurality of passages in said device, electrical means for heating one of said passages, and means including a dividing valve for controlling the flow of fluid through said passages and simultaneously controlling the operation of said heating means.

12. A dentist's water heater comprising a casing having an inlet and an outlet a plurality of passages through said casing, a dividing valve in said inlet for selectively controlling the flow of water through said passages, one passage for unheated water terminating in a beveled end adjacent said outlet, another passage conducting the water over and along an electric heating unit of the immersion type, and means connected to said valve for closing the circuit through said heating unit when water is directed through said second passage.

13. A dentist's water heater comprising a casing, a partition in said casing forming an upper chamber and a lower chamber, means conducting water into said casing including a dividing valve, an outlet leading from said upper chamber, a pipe for unheated water leading into said upper chamber and terminating adjacent said outlet, a pipe leading from said valve into said lower chamber, a heating unit in said lower chamber, a tubular member surrounding said unit and leading into said upper chamber, a switch for controlling said unit, and means whereby said switch is operated directly from said valve including a lever on said switch and a cam surface on said valve, said means being so adjusted that the heating unit is in operation only when water is directed into said lower chamber.

Signed by me at Boston, Massachusetts, this ninth day of March, 1922.

CHARLES E. PARKHURST.